United States Patent [19]

Propster et al.

[11] 4,330,314

[45] May 18, 1982

[54] APPARATUS AND PROCESS FOR PREDRYING AND PREHEATING GLASS BATCH AGGLOMERATES BEFORE MELTING

[75] Inventors: Mark A. Propster, Gahanna; Stephen Seng, Frazeysburg; Charles Hohman, Granville, all of Ohio

[73] Assignee: Owens-Corning Fiberglas Corporation, Toledo, Ohio

[21] Appl. No.: 206,325

[22] Filed: Nov. 12, 1980

[51] Int. Cl.$^3$ .............................................. C03B 3/00
[52] U.S. Cl. .......................................... 65/27; 65/335
[58] Field of Search .............. 65/27, 335; 106/DIG. 8

[56] References Cited

U.S. PATENT DOCUMENTS

| 4,184,861 | 1/1980 | Erickson et al. | 65/27 |
| 4,225,332 | 9/1980 | Tsay | 65/27 |
| 4,248,615 | 3/1981 | Seng et al. | 65/27 |
| 4,248,616 | 2/1981 | Seng et al. | 65/27 |

Primary Examiner—Richard V. Fisher
Attorney, Agent, or Firm—Ronald C. Hudgens; Patrick P. Pacella

[57] ABSTRACT

Disclosed is a method for manufacturing glass, and apparatus for effecting same, which comprises passing flue gases from a glass melting furnace through a bed of agglomerates of glass forming batch materials so as to heat the agglomerates to a temperature less than that at which they form an aggregated mass, cooling the flue gases as they pass through the bed with a heat exchanger positioned in the bed, and then melting the heated batch materials in a fossil fuel fired melter to form molten glass. The heat transfer medium of the indirect heat exchanger then is transported to a predryer to dry the agglomerates before they are fed to the preheat hopper.

8 Claims, 1 Drawing Figure

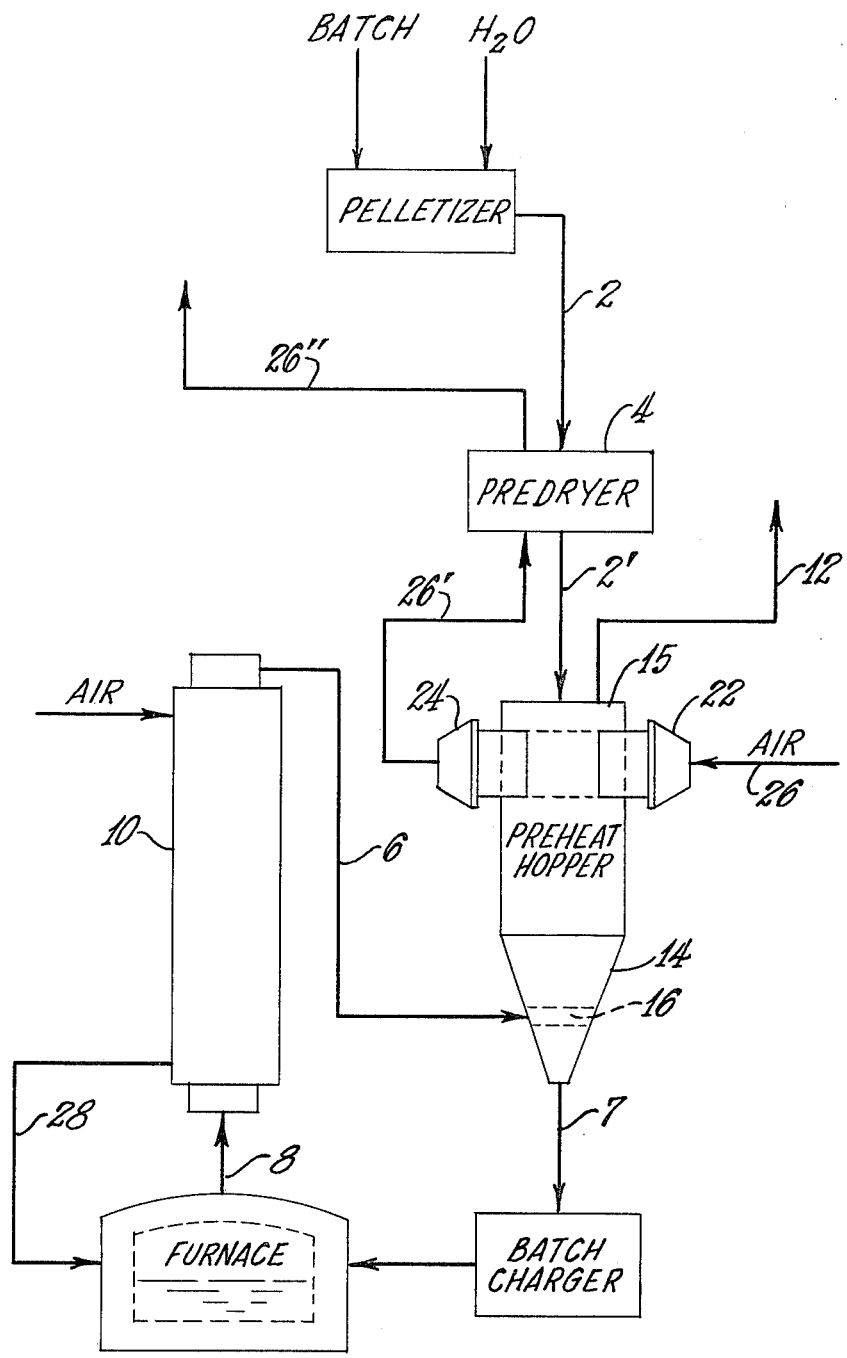

bility of making glass manufacturing more energy efficient without increasing environmental pollution.

APPARATUS AND PROCESS FOR PREDRYING AND PREHEATING GLASS BATCH AGGLOMERATES BEFORE MELTING

TECHNICAL FIELD

The present invention relates to the art of glass manufacturing. More particularly, this invention relates to an improved process which minimizes the amount of energy which is wasted by discharge to the atmosphere.

BACKGROUND ART

Methods are known in the art for glass manufacturing wherein glass-forming, batch ingredients are converted into agglomerates and these agglomerates then heated in a chamber by a direct contact with flue gases from a glass melting furnace so as to produce free-flowing, non-aggregated, agglomerates which are then conveyed and discharged to the glass melting furnace. These agglomerates are composite, integral, self-supporting masses consisting essentially of all the substantial batch materials and may take the form of balls, extrusions, discs, briquettes, and pellets. One such method is a process for making glass wherein free water-containing pellets are discharged to a vertical bed contained within a chamber and furnace flue gases pass, in direct contact with and countercurrently to, downwardly moving pellets of the bed to dry and preheat them. The flue gases enter the pellet bed on the order of about 1500° F. (816° C.) and the process is operated so as to prevent water in the gases from condensing in the chamber. In this manner, volatile pollutants in the flue gases are extracted and recycled to the melter via the pellets.

In contrast to the direct extraction of heat from the flue gases as they pass through the furnace, another method provides an improvement by indirectly extracting heat from the flue gases in the chamber during the heating of the agglomerated glass batch.

Because a heat transfer medium is heated by the indirect heat exchange process, the medium is ideally suited for beneficial recovery and utilization of its energy.

DISCLOSURE OF INVENTION

We have discovered that heat transfer medium of the indirect heat exchange process can be used to predry the agglomerates before continuously feeding them countercurrently to the flow of exhaust gases in the preheat hopper. Prior to this invention, predrying took place in a separate dryer with external heating, or in a predryer with spent exhaust gases which have already passed through the bed of agglomerates in the preheat hopper.

From the foregoing it will be seen that this invention provides for a more energy efficient process of glass manufacturing which will not increase environmental pollution. Desirable results will be realized when the indirect heat extraction is effected by air flowing through a hollow duct member and, preferably, a plurality of duct members.

BRIEF DESCRIPTION OF DRAWING

The attached drawing is a schematic illustration of glass manufacturing utilizing the heat extraction of this invention to predry agglomerates.

BEST MODE OF CARRYING OUT INVENTION

Referring now to the drawing, it will be seen that glass forming, batch materials, and water, are converted into individual agglomerates, preferably pellets, on a rotating disc pelletizer. The free water content of the pellets may be about 10-20% by weight and, while not shown, the pellets preferably are subjected to a screening operation to select pellets of a nominal size of about ⅜" to ⅝" in diameter. These pellets are then transported by suitable means 2, such as a belt conveyor, to a predryer 4 and then in turn the pellets are fed by suitable means 2' to a preheat hopper which maintains a bed of pellets (not shown) therein. Pellets generally move downwardly in the bed and are discharged therefrom as hot, individual pellets and supplied by a duct member 7 to a batch charger which conveys them to a fossil fuel fired glass melting furnace. The combustion gases, or flue gases, from the melting furnace are conveyed by suitable means 8, for example a duct, to a recuperator 10 where they are indirectly cooled with air, for example, from a temperature of about 2600° F. (1427° C.) to a temperature on the order of about 1400° F.-1500° F. (760° C.-816° C.). The heated air 28 is then supplied to the furnace as combustion make-up air. The cooled flue gases are then conveyed by suitable duct means 6 to the preheat hopper where they flow in direct contact with the pellets, in countercurrent flow fashion, to preheat the pellets. The flue gases leave the preheat hopper by a suitable outlet, generally designated 12. Preferably the flue gases will be supplied to the preheat hopper by a manifold type arrangement with entrances into the hopper being on diametrically opposed sides of a lower frustoconical portion 14. In accordance with sound engineering practices, the gases will be distributed generally uniformly across the heater as by employing an inverted V-shaped member 16, which spans frustoconical portion 14.

The heat exchanger contemplated herein is positioned in the pellet bed of the cylindrical portion 15 of the pellet heater. As generally illustrated in the drawing, the heat exchanger comprises an inlet manifold 22 to which is supplied ambient air via a duct 26, and disposed on the opposite side, externally of the pellet heater, is an outlet manifold 24 from which the heated air is removed via a duct 26'. A plurality of hollow, duct members having the heat transfer medium therein are located in the pellet bed between inlet manifold 22 and outlet manifold 24. Desirably, the system will be operated such the the upper most level of pellets in the hopper will be disposed upwardly of the heat exchanger and, generally the heat exchanger will be located in the upper half of the pellet bed.

The heated air removed via duct 26' then is supplied to predryer 4 to dry the agglomerates prior to heating them. The temperature of the heated air exiting the predryer via duct 26" is maintained sufficiently above the wet bulb temperature so as to preclude water condensation in the predryer. An auxiliary air combustion system (not shown) can be provided to insure that this temperature is maintained.

The reason this is done is because the air heated in the heat exchanger has a low dew point of less than 85° F. This means that the depth of pellets that can be totally dried in the predryer without forming clumps can be as deep as about 9 inches. With a prior art drying process using spent exhaust gases from the preheat hopper, which have a higher dew point of about 120° F., one can only dry a bed of pellets 2 to 4 inches deep. With gases at a dew point of 136° F., the entire bed would be a cemented mass of pellets.

In one embodiment, predrying is effected by drying static beds of agglomerates in separate chambers by passing the heated air up through the beds. Preferably, the beds are discharged gravitationally, downwardly to the preheat hopper by moving the bed laterally against a scraper means for scraping the bed from a bed supporting means. The bed supporting means is a plurality of parallel rods, screen or grates that prevent the pellets or agglomerates from dropping therethrough, yet enable the heated air from duct 26' to flow through the bed from the bottom of the receptacle. A layer of pellets, not in excess of about 9 inches can be dried at one time with another layer of wet pellets being formed after the dried pellets are discharged to the preheat hopper. The pellets charged into the preheat hopper are free flowing.

INDUSTRIAL APPLICABILITY

The present invention is especially uniquely adapted for use in drying and preheating hydrologically unstable, free water containing glass batch agglomerates, preferably pellets. Exemplary of such glass batches are the soda-lime-silicate and soda-lime-aluminoborosilicate glasses.

The soda-lime glasses usually are bottle or flat glass compositions and the soda-lime-aluminoborosilicates usually are wool glasses used for insulation.

The wool batch ingredients can be melted in a typical gas-fired melting furnace. The melt is then formed into multiple streams of glass which are attenuated into individual fibers by the rotary process.

Various treatments may be applied to the fibers as they are produced. For example, the use of aqueous dispersions comprising phenolic resoles as binders in the production of wool and board products from glass and other vitreous fibers is common practice. The phenolic resoles also can be modified to improve resistance to heat, including flame, by reaction with dicyandiamide. Similar use of melamine, urea and thiourea to modify phenolic resoles also are known.

We claim:

1. A process for producing glass by charging to a melting furnace and melting therein a glass batch, comprising the steps of agglomerating the batch using a liquid, drying the wet agglomerates, charging the dried agglomerates onto the upper surface of a vertical bed preheat hopper having a lower discharge end communicating with the furnace, withdrawing agglomerates through said lower discharge end for charging to the furnace, moving the remaining agglomerates by gravity downwardly through the bed, passing hot furnace exhaust gases upwardly through the bed to heat the agglomerates therein, indirectly extracting heat from said exhaust gases in the preheat hopper and employing the indirectly extracted heat in the step of drying the wet agglomerates.

2. A process according to claim 1 wherein the indirect heat extraction is effected by air flowing from one side of the preheat hopper to an opposite side through a duct member positioned in the preheat hopper.

3. A process according to claim 2 wherein the amount of heat extracted in drying the wet agglomerates is insufficient to condense water vapor in the air heated by the indirect heat extraction.

4. A process according to claim 1 wherein a bed of wet agglomerates up to about 9 inches deep can be dried without clumping.

5. A process according to claim 4 wherein the dried agglomerates charged to the preheat hopper are free flowing.

6. A glassmaking apparatus comprising: means for converting glass-forming ingredients into agglomerates, a combustion-heated glass melting furnace, means for cooling combustion gases, means for predrying the agglomerates, means for preheating a bed of said agglomerates by direct contact with the combustion gases of said furnace, means for transporting agglomerates from said converting means to said predryer means, means for transporting agglomerates from said predrying means to the preheating means, means conveying combustion gases from said furnace to said combustion gas cooling means then to said preheat means, means for conveying preheated agglomerates from said preheating means to said furnace, heat exchange means disposed in said preheat means for indirectly extracting heat from said combustion gases, and means for conveying the indirectly extracted heat to said predrying means.

7. An apparatus according to claim 6 wherein said heat exchange means comprises an inlet manifold disposed on one side of said preheating means, an outlet manifold disposed on a side of said preheating means opposite said inlet manifold and at least one hollow duct member having a heat transfer medium therein, said duct member being in fluid communication with said manifolds.

8. An apparatus according to claim 7 having a plurality of hollow duct members.

* * * * *